(12) United States Patent
Huang

(10) Patent No.: US 8,073,650 B2
(45) Date of Patent: Dec. 6, 2011

(54) DIMENSION MEASURING APPARATUS

(75) Inventor: Chien-Feng Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 214 days.

(21) Appl. No.: 12/634,827

(22) Filed: Dec. 10, 2009

(65) Prior Publication Data

US 2010/0312520 A1 Dec. 9, 2010

(30) Foreign Application Priority Data

Jun. 9, 2009 (CN) .......................... 2009 1 0303058

(51) Int. Cl.
*G01B 5/00* (2006.01)
(52) U.S. Cl. ...................................................... 702/150
(58) Field of Classification Search .................... 702/150
See application file for complete search history.

(56) References Cited

U.S. PATENT DOCUMENTS

| 3,861,808 | A | * | 1/1975 | Halsey ........................... 356/605 |
| 5,024,512 | A | * | 6/1991 | Greene et al. .................. 359/375 |
| 6,320,658 | B1 | * | 11/2001 | Mizutani ....................... 356/399 |
| 6,358,749 | B1 | * | 3/2002 | Orthman ........................ 436/177 |
| 2006/0139642 | A1 | * | 6/2006 | Van Bilsen ..................... 356/400 |
| 2009/0073392 | A1 | * | 3/2009 | Mann et al. ..................... 353/66 |

* cited by examiner

*Primary Examiner* — Cindy Hien-Dieu Khuu
(74) *Attorney, Agent, or Firm* — Altis Law Group, Inc.

(57) ABSTRACT

An exemplar dimension measuring apparatus includes a objective, a stage for fixing a workpiece, a projecting member located between the objective and the stage, a light source under the stage, configured for illuminating the workpiece such that a projection of the workpiece is formed on the projection member, an eyepiece coupled with the objective, and a processing unit. The eyepiece has a reticle, configured for viewing opposite extremities of the projection and facilitating alignment of the reticle with each of the extremities of the projection. The processing unit is configured for storing X-coordinates of the extremities of the projection on a Cartesian coordinate system, and calculating a difference between X-coordinates of the opposite extremities of the projection.

12 Claims, 4 Drawing Sheets

DIMENSION MEASURING APPARATUS

BACKGROUND

1. Technical Field

The present disclosure relates to a measuring apparatus, and more particularly, a dimension measuring apparatus for measuring for example a length of a workpiece.

2. Description of Related Art

In manufacturing, workpieces are commonly fixed on a spindle and machined. During machining, the workpiece may be frequently detached from the spindle to be measured. However, a typical precise measuring apparatus generally has complex structure, high price, and complicated operation. Therefore, it is needed to provide a dimension measuring apparatus to overcome the problems described above.

BRIEF DESCRIPTION OF THE DRAWINGS

Many aspects of the present dimension measuring apparatus can be better understood with reference to the following drawings. The components in the drawings are not necessarily drawn to scale, the emphasis instead being placed upon clearly illustrating the principles of embodiments of the dimension measuring apparatus. Moreover, in the drawings, all the views are schematic, and like reference numerals designate corresponding parts throughout the different views.

DETAILED DESCRIPTION

Figure 1:
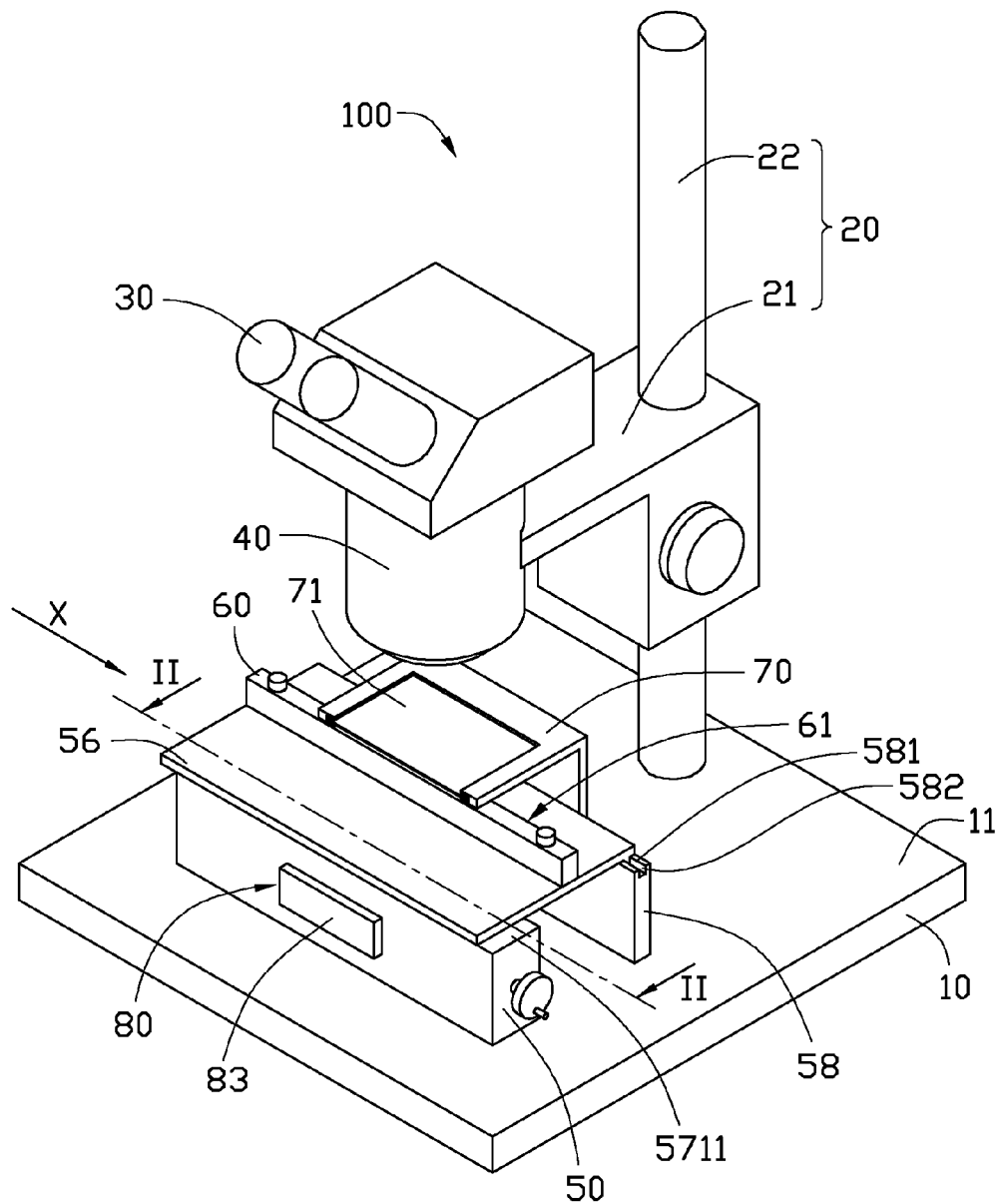
FIG. 1 is an isometric, perspective view of a dimension measuring apparatus in accordance with an exemplary embodiment, the dimension measuring apparatus includes a driving device, a processing unit, a base, an eyepiece, and an objective.
Figure 2:
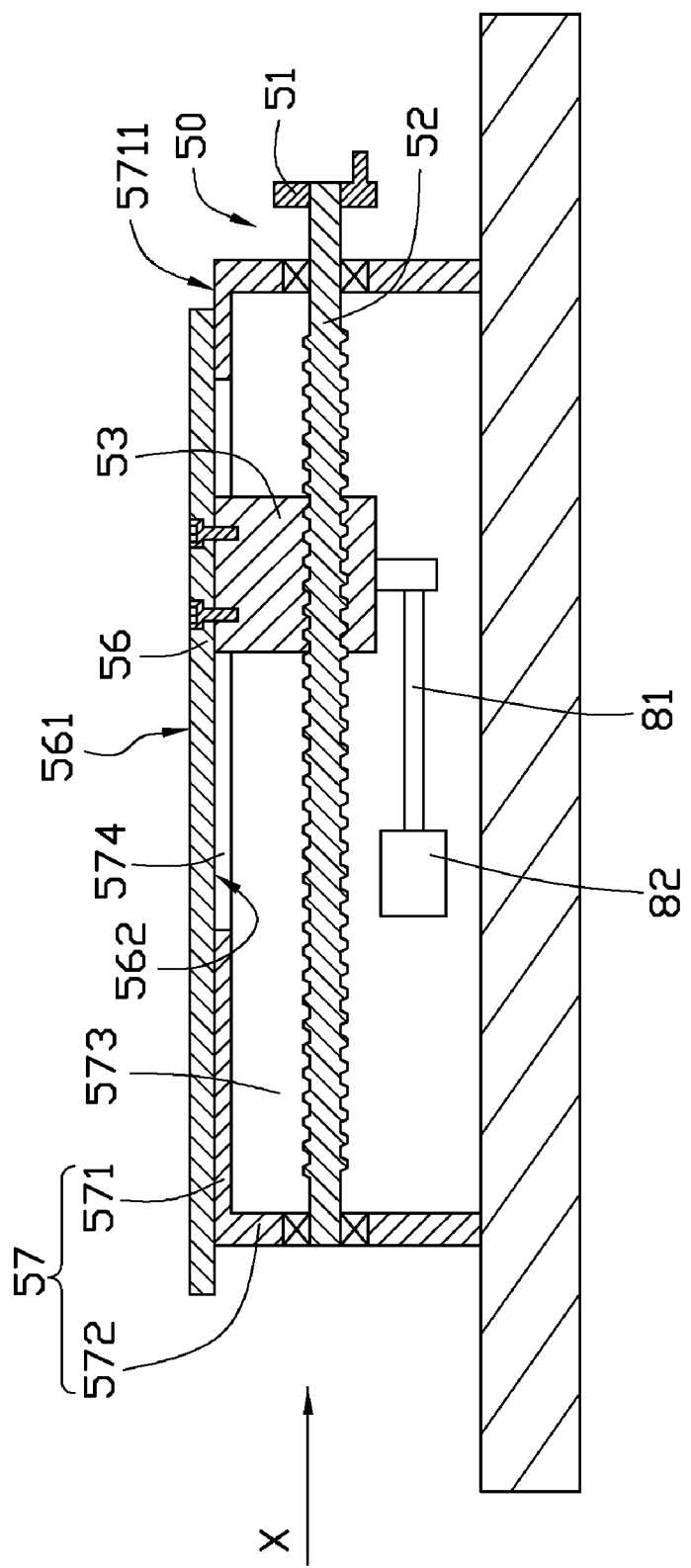
FIG. 2 is a cross-sectional view of the driving device, the processing unit and the base of FIG. 1, taken along line II-II.
Figure 3:
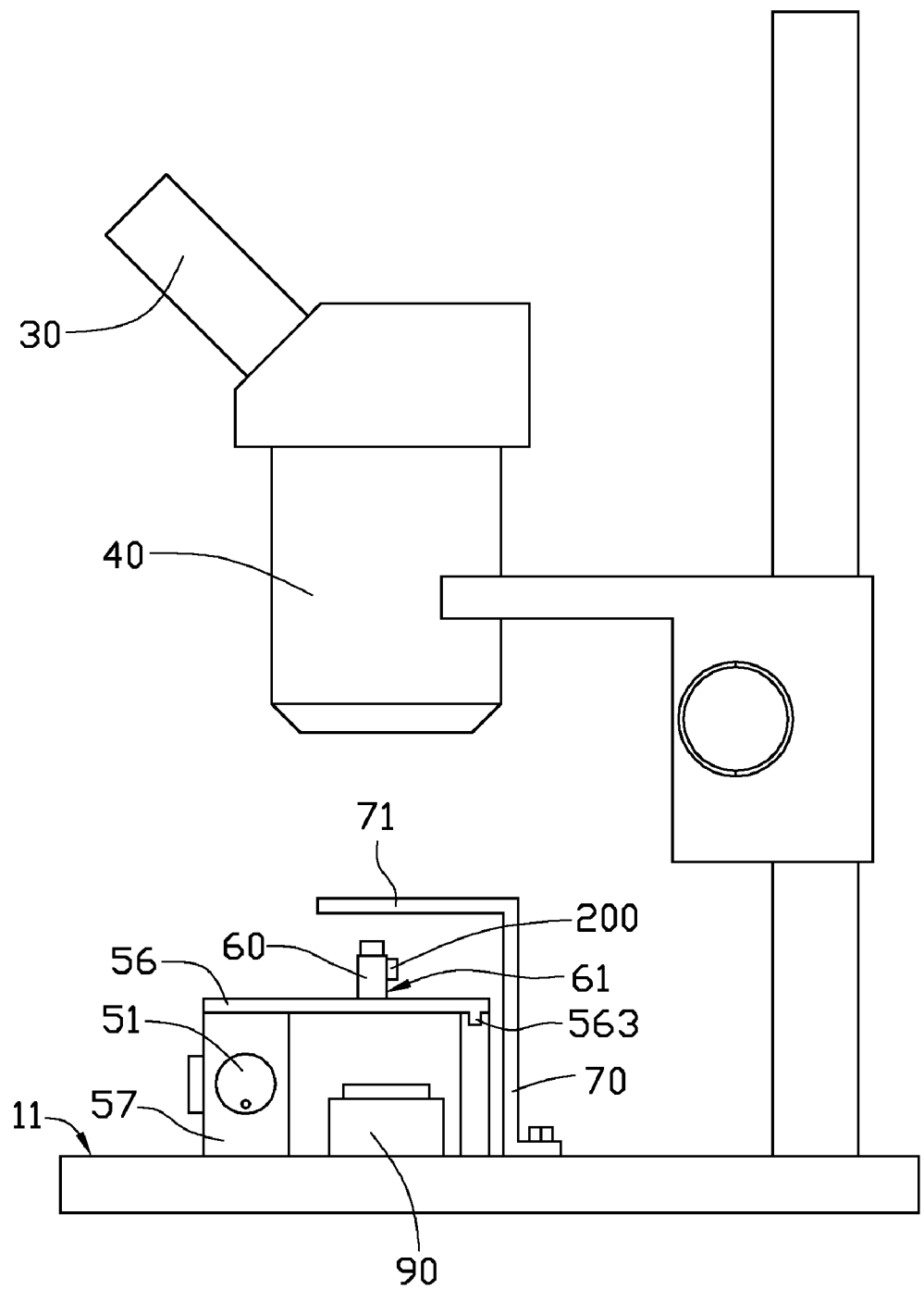
FIG. 3 is a side view of measuring a length of a workpiece using the dimension measuring apparatus of FIG. 1.

Referring to FIGS. 1-3, a dimension measuring apparatus 100 provided in an exemplary embodiment includes a base 10, a fixing member 20, an eyepiece 30, an objective 40, a driving device 50, a stage 60, a projecting member 70, a processing unit 80, and a light source 90.

The base 10 has a horizontal outer surface 11. The fixing member 20 includes a movable member 21 and a fixing shaft 22 passing through the movable member 21. The movable member 21 is capable of moving along the fixing shaft 22. The fixing shaft 22 perpendicularly extends from the outer surface 11. The objective 40 and the eyepiece 30 are connected to the movable member 21, and over the outer surface 11 in described order with the objective 40 facing the outer surface 11. A distance between the objective 40 and the outer surface 11 is adjustable when the movable member 21 moves along the fixing shaft 22.

The driving device 50 includes a support member 57, a guiding member 58, a driver 51, a rotatable shaft 52, a movable table 56, and a restricting member 53.

The support member 57 includes a top panel 571 and four side panels 572. The side panels 572 extend from the outer surface 11 of the base 10 and connect with boundaries of the top panel 571. Therefore, the top panel 571 and the side panel 572 cooperatively define a chamber 573. The top panel 571 has a carrying surface 5711 parallel to the outer surface 11, and defines a slit 574 spanned from the carrying surface 5711 and communicated with the chamber 573.

The guiding member 58 extends perpendicularly from the outer surface 11 of the base 10, facing the driving device 50. The guiding member 58 has a horizontal supporting surface 581 with a groove 582 defined therein. A distance between the supporting surface 581 and the outer surface 11 is approximately equal to that between the carrying surface 5711 and the outer surface 11.

The movable table 56, made of transparent materials such as glass, PMMT, or other likes, is placed on the carrying surface 5711 of the top panel 571 and the supporting surface 581 of the guiding member 58. The movable table 56 has a first surface 561 and an opposite second surface 562. Both the first and second surfaces 561, 562 are parallel to the outer surface 11 of the base 10. Additionally, the movable table 56 has a protrusion 563 extending from the second surface 562. The protrusion 563 is fittingly received in the groove 582 and capable of moving along the groove 582. The restricting member 53 is connected to the second surface 562 of the movable table 56, a portion of the restricting member 53 is fittingly received in the slit 574, and another portion of the restricting member 53 is accommodated in the chamber 573. The rotatable shaft 52 passes through two opposite side panels 572 with its center axis parallel to a center axis of the groove 582. The driver 51 connects with an end of the rotatable shaft 52, configured for rotating the rotatable shaft 52 round its center axis. In the present embodiment, the driver 51 is a handwheel, and the rotatable shaft 52 is a screw rod rotated by the handwheel. In alternative embodiments, the driver 51 can be a motor, or an element capable of pulling or pushing the rotatable shaft to move along a direction parallel to the center axis of the groove 582. Additionally, the restricting member 53 is threadedly engaged around the rotatable shaft 52. As such, the restricting member 53 is capable of moving along the slit 574 when the rotatable shaft 52 rotates round its center axis.

The stage 60 is fixed on the first surface 561 of the movable table 56, facing to the objective 40. The stage 60 has a fixing surface 61 perpendicular to the outer surface 11 of the base 10, configured for fixing a workpiece 200 to be measured. When the driver 51 is rotated, the stage 60 is capable of moving together with the movable table 56 along a longitudinal direction of the slit 574.

The projecting member 70 is fixed on the outer surface 11 of the base 10, including a projecting board 71. The projecting board 71 is intermediately located between the stage 60 and the objective 40, horizontally facing the stage 60 and the objective 40.

The light source 90 is aligned with the stage 60, and located between the support member 57 and the guiding member 58, configured for illuminating the workpiece 200 fixed on the fixing surface 61 of the stage 60. For purpose of improving measuring precision, the light source 90 is a laser having a single wavelength.

The processing unit 80 includes a position detector 81, a processor 82, and a display 83, configured for storing X-coordinates of the extremities of the projection on a Cartesian coordinate system, and calculating a difference between X-coordinates of the opposite extremities of the projection. In the present embodiment, the Cartesian coordinate system shown in FIG. 1 has an X axis parallel to the rotatable shaft 52. The position detector 81 is a typical linear position detecting rod. The position detector 81 is parallel to the rotatable shaft 52 and two ends thereof are respectively connected to the restricting member 53 and the processor 82. The position detector 81 is configured for detecting positions of the restricting member 53 and transferring the position to the processer 82. The processer 82 is configured for converting the positions into corresponding coordinates, storing the coordinates and calculating a difference between the coordinates.

Figure 4:
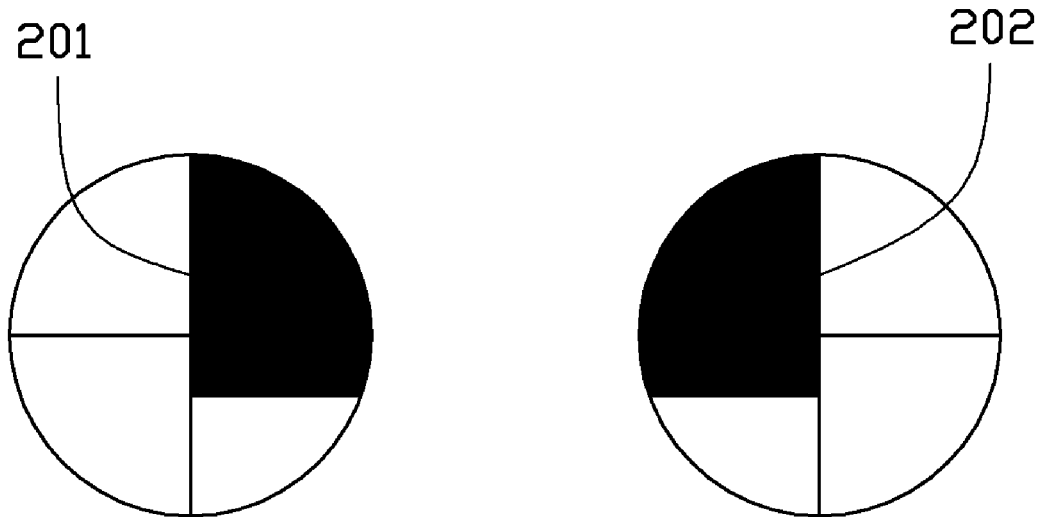
FIG. 4 is a top view of two extremities of the workpiece aligned with a reticle of the eyepiece.

In operation, referring to FIGS. 2, 3 and 4, a workpiece 200 is firstly fixed on the fixing surface 61 of the stage 60 with a center axis thereof parallel to the projecting board 71. Secondly, the light source 90 is turned on, thus, a projection of the workpiece 200 is obtained on the projecting board 71. In this embodiment, a length of the projection is equal to a length of the workpiece 200. Thirdly, focal lengths of the eyepiece 30 and the objective 40 are respectively adjusted until the projection of the workpiece 200 is clearly viewed in the eyepiece 30. Subsequently, the driver 51 drives the rotatable shaft 52 to rotate round its center axis, and then the movable table 56 and the stage 60 are moved until a first extremity 201 of the projection of the workpiece 200 is aligned with a reticle of the eyepiece 30. The position detector 81 detects a first position of the restricting member 53 and transfers the first position to the processer 82, the processer 82 converts the first position into a first coordinate and storage the first coordinate. Lastly, the stage 60 is moved again until a second extremity of the projection 202, opposite to the first extremity of the projection 201, is aligned with the reticle of the eyepiece 30. The position detector 81 detects a second position of the restricting member 53 and transfers the second position to the processer 82, the processer 82 transforms the second position into a second coordinate, stores the second coordinate and calculates a distance between the first and second coordinates. Therefore, a length of the workpiece, i.e., the difference between the first and second coordinates, is obtained and displayed in the display 83.

The dimension measuring apparatus 100 measures the length of a projection of the workpiece 200 to obtain the length of the workpiece 200. The dimension measuring apparatus 100 is simply structured and easily operated.

In alternative embodiments, the movable table 56 is omitted. Accordingly, the restricting member 53 is fittingly received in the slit 574 and connected to the stage 60. The length of the projection is equal to several times of the length of the workpiece 200. And the processer 82 further divides the length of the projection a magnification, thereby obtaining the length of the workpiece 200.

While certain embodiments have been described and exemplified above, various other embodiments will be apparent from the foregoing disclosure to those skilled in the art. The present disclosure is not limited to the particular embodiments described and exemplified but is memberable of considerable variation and modification without departure from the scope and spirit of the appended claims.

What is claimed is:

1. A dimension measuring apparatus, comprising:
   an objective;
   a stage for fixing a workpiece;
   a projecting member located between the objective and the stage;
   a light source under the stage, configured for illuminating the workpiece such that a projection of the workpiece is formed on the projection member;
   an eyepiece coupled with the objective, the eyepiece having a reticle, configured for viewing opposite extremities of the projection and facilitating alignment of the reticle with each of the extremities of the projection; and
   a processing unit for storing X-coordinates of the extremities of the projection on a Cartesian coordinate system, and calculating a difference between X-coordinates of the opposite extremities of the projection.

2. The dimension measuring apparatus of claim 1, further comprising a driving device for driving the stage to move in a direction parallel to the X axis direction.

3. The dimension measuring apparatus of claim 2, wherein the driving device comprises a support member, a rotatable shaft, and a restricting member, the support member has a slit, the restricting member is received in the slit and connected to the stage and threadedly engaged with the rotatable shaft, such that the stage is capable of moving jointly with the restricting member along the slit when the rotatable shaft rotates round a center axis of the rotatable shaft.

4. The dimension measuring apparatus of claim 3, wherein the driving device further comprises a movable table located between the stage and the support member, the restricting member and the stage are fixed on opposite sides of the movable table.

5. The dimension measuring apparatus of claim 3, wherein the processing unit comprises a position detector for detecting two positions of the restricting member at each of which the reticle is aligned with either of the extremities of the projection, and a processor for converting the positions of the restricting member into two respective coordinates thereof on the Cartesian coordinate system, and calculating a difference between the coordinates, and two ends of the position detector are respectively connected with the restricting member and the processor.

6. The dimension measuring apparatus of claim 3, further comprising a driver connected to one end of the rotatable shaft, configured for rotating the rotatable shaft.

7. The dimension measuring apparatus of claim 3, wherein the rotatable shaft is a screw rod.

8. The dimension measuring apparatus of claim 4, wherein the driving device further comprises a guiding member facing the support member, the guiding member is configured for guiding the movable table guiding member to move relative to the support member.

9. The dimension measuring apparatus of claim 8, further comprising a base, wherein the support member and the guiding member extend from the base, a height of the support member is approximately equal to that of the guiding member.

10. The dimension measuring apparatus of claim 9, wherein the guiding member defines a groove in a top surface.

11. The dimension measuring apparatus of claim 10, wherein the movable table has a protrusion extending from an underside surface thereof, the protrusion is slidably received in the groove.

12. The dimension measuring apparatus of claim 8, wherein the light source is located between the support member and the guiding member, and aligned with the stage.

* * * * *